(12) United States Patent
Townsend

(10) Patent No.: US 9,053,243 B2
(45) Date of Patent: Jun. 9, 2015

(54) UNIDIRECTIONAL AND BIDIRECTIONAL COMMUNICATION BETWEEN A HOST DEVICE AND A PERIPHERAL DEVICE

(71) Applicant: Google Inc., Mountain View, CA (US)

(72) Inventor: Karl Alun Townsend, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/047,959

(22) Filed: Oct. 7, 2013

(65) Prior Publication Data

US 2014/0101343 A1    Apr. 10, 2014

Related U.S. Application Data

(60) Provisional application No. 61/712,144, filed on Oct. 10, 2012, provisional application No. 61/789,670, filed on Mar. 15, 2013.

(51) Int. Cl.
*G06F 3/00* (2006.01)
*G06F 13/12* (2006.01)
*G06F 13/38* (2006.01)

(52) U.S. Cl.
CPC .................................. *G06F 13/385* (2013.01)

(58) Field of Classification Search
None
See application file for complete search history.

(56) References Cited

U.S. PATENT DOCUMENTS

2008/0125107 A1* 5/2008 Zechlin et al. ............. 455/422.1
2012/0236706 A1* 9/2012 Ambuehl et al. ............. 370/216

* cited by examiner

*Primary Examiner* — Idriss N Alrobaye
*Assistant Examiner* — David Martinez
(74) *Attorney, Agent, or Firm* — Morris & Kamlay LLP

(57) ABSTRACT

A dock connects to a user's host device and provides video output to a display. The host device is a computing device that executes one or more applications. One or more controllers are peripheral devices that can be used to control applications on the host device. A service module provides support for additional communication profiles that are more versatile than the communication profiles supported by the operating system on the host device. The service module establishes a unidirectional connection between the host device and the peripheral devices as well as a bidirectional connection. A control scheme identifying an operating mode associated with a peripheral device is retrieved from a server. The peripheral device is configured to send data to the host device in a format recognizable by one or more applications based on the operating scheme.

13 Claims, 11 Drawing Sheets

| Controller Number 452 | Device Identifier 454 | Controller Type 456 | Connection Status 458 |
|---|---|---|---|
| Controller 1 | BT_GP_4 | Gamepad | Connected |
| Controller 2 | BT_PDL_2 | Paddle | Not Connected |
| Controller 3 | BT_PDL_1 | Paddle | Connected |
| Controller 4 | BT_GP_2 | Gamepad | Connected |

UNIDIRECTIONAL AND BIDIRECTIONAL COMMUNICATION BETWEEN A HOST DEVICE AND A PERIPHERAL DEVICE

CROSS REFERENCE TO RELATED APPLICATIONS

This application claims the benefit of U.S. Provisional Application No. 61/712,144, filed Oct. 10, 2012, and U.S. Provisional Application No. 61/789,670, filed Mar. 15, 2013, which are incorporated by reference in its entirety.

BACKGROUND

1. Field of Art

The disclosure relates to the field of electronic games operating on a host device, and more particularly to the communication between a host device and a peripheral device while a user interacts with an electronic game.

2. Description of the Related Art

Modern smartphones, tablet computers, and other mobile devices have a rapidly increasing amount of processing power, graphics capabilities, connectivity options, storage, and memory. As a result, mobile devices are becoming a preferable platform for electronic games. However, mobile devices have many limitations. For example, games on mobile devices are difficult, and even impractical, to experience with multiple users participating using the same screen as an interface. In addition, the touchscreens that are included in most mobile devices as the primary input device are poorly suited for interacting with many types of games and cannot be used to implement complex control schemes.

Some wireless technology standards offer multiple communication profiles that can be used for communication between devices, such as between a smartphone and a controller. For example, the Bluetooth® wireless standard includes profiles such as the Human Input Device Profile (HID) and the Serial Port Profile (SPP).

Mobile operating systems are generally configured to support a limited set of communication profiles. In particular, the operating systems of typical mobile computing devices, such as smartphones and tablet computers, typically connect to input devices via a unidirectional profile (e.g., HID) that only allows data to be sent from the input device to the computing device. However, unidirectional profiles cannot be used to send data back to the input device. This is particularly disadvantageous when connecting a game controller to the computing device because game controllers typically include features (e.g., indicator LEDs or motors for force feedback) that are controlled by signals received from a host device.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of Multi-Platform Gaming System

Figure 1:
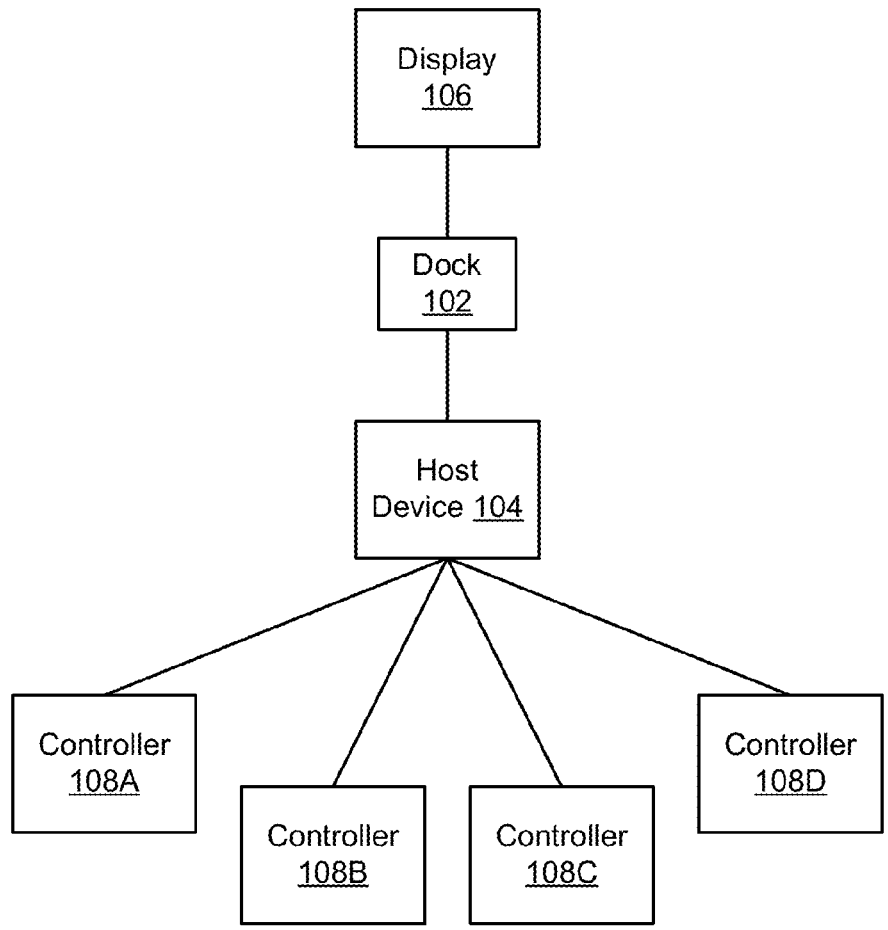
FIG. 1 is a block diagram illustrating a system environment for dynamically switching between communication profiles, according to one embodiment.

FIG. 1 is a block diagram illustrating a system environment 100 for dynamically switching between communication profiles, according to one embodiment. The system includes a dock 102, a host device 104, a display 106, and controllers 108.

The dock 102 connects to a user's host device 104 and provides video output to a display 106. The dock 102 can also provide power to the host device 104 for charging, convert an audio/video stream from the host device 104 to an interface suitable for driving the display 106, and provide a mechanical stand on which to place the host device 104 during gameplay.

In one embodiment, the host device 104 outputs audio/video data over a microUSB connection in accordance with the MHL (Mobile High-Definition Link) standard. In this embodiment, the dock 102 includes an MHL receiver that converts MHL into HDMI.

In another embodiment, the host device 104 has an HDMI port, and the dock simply allows an HDMI signal to pass through and be outputted to the display 106 through the dock's HDMI port. In still another embodiment, the dock 102 contains a DisplayPort converter to convert from DisplayPort to HDMI (e.g., for use with a phone or tablet, for example, and ANDROID platform phone or tablet).

In one embodiment, the dock 102 includes a DC jack that charges the host device 104 via the microUSB port and provides power to the MHL receiver. Alternatively, the dock 102 may have a built-in power supply that receives AC power.

In some embodiments, the dock 102 includes additional features and performs additional functions that improve the performance of the launcher application 110 and the games executing on the host device 104. For example, the dock 102 may include an Ethernet port that connects to a network, which may be useful in locations where the networking hardware inside the host device 104 (e.g., a data or wireless connection) is unreliable.

The dock 102 may also include a Radio Frequency Identification Tag (RFID tag) that can be read by a Near Field Communication (NFC) device on the host device 104. In one embodiment, the RFID tag includes data that causes the host device 104 to automatically start a launcher application. For example, the RFID tag may contain an identifier for the launcher application (described below) that follows a naming convention established by the operating system of the host device 104. In another embodiment, the RFID tag includes a command that causes the host device 104 to automatically resume the user's most-recently played game (or most-recently used application) using a game state saved on the user's controller 108A. In still another embodiment, the RFID tag includes a command that causes the host device 104 to access a specified URL in a browser. This may be useful, for example, if the launcher application or one of the games is implemented as a server-based program (e.g., in HTML5).

In another embodiment, the dock 102 includes the RFID tag but does not include components for relaying a video signal to the display 106. In these embodiments, the dock may simply have a cradle or coaster shape that holds the host device 104 while a separate device is used to convert the audio/video stream from the host device to an interface suitable for driving the display 106.

In still another embodiment, the dock 102 is omitted and the host device 104 sends a video output signal to the display 106 over a communication link (e.g., an HDMI cable).

The host device 104 a computing device that executes one or more applications. In one embodiment, the host device 104 runs the ANDROID operating system (e.g., a smartphone or tablet computer). In another embodiment, the host device 104 runs the IOS operating system (e.g., an IPHONE, IPOD TOUCH, or IPAD). In another embodiment, the dock 102 and the host device 104 may be merged into a single device that executes games and outputs signals to a display 106. In still another embodiment, the display 106 acts as the host device 104. For example, the display 106 may include electronic components that are capable of running the ANDROID operating system. The host device 104 is described in further detail with reference to FIG. 2.

In one embodiment, a single video signal is rendered on the host device 104 (e.g., the operating system and the games), and the signal is output to be mirrored on the display 106. In this embodiment, a display on the host device 104 (e.g., a touchscreen) may display the same signal, or the host device's display may simply be turned off. In another embodiment, the host device 104 renders two different video signals. One signal is shown on a display in the host device (e.g., a touchscreen), and the second signal is sent to be shown on display 106. For example, an implementation of a poker game may show the cards in a player's hands on the host device's display and shown the cards on the poker table on the display 106.

The controllers 108 are peripheral devices that can be used to control applications and navigate user interfaces on the host device 104. Although only four controllers 108 are shown, the system 100 may include additional or fewer controllers (e.g., 2, 3, 5, 8, etc), and different types of controllers 108 may be connected at once. In one embodiment, the controllers 108 include the example controllers 108 described with reference to FIGS. 3A-3E. In addition to controllers 108, the host device 104 may also be connected to other types of peripheral devices, such as keyboards, mice, headsets.

In some embodiments, the host device 104 connects to a backend server (not pictured) over a network (not pictured) to access a marketplace. The marketplace provides applications that are designed to work with the controllers 108.

Description of Example Embodiments for Host Device

Figure 2:
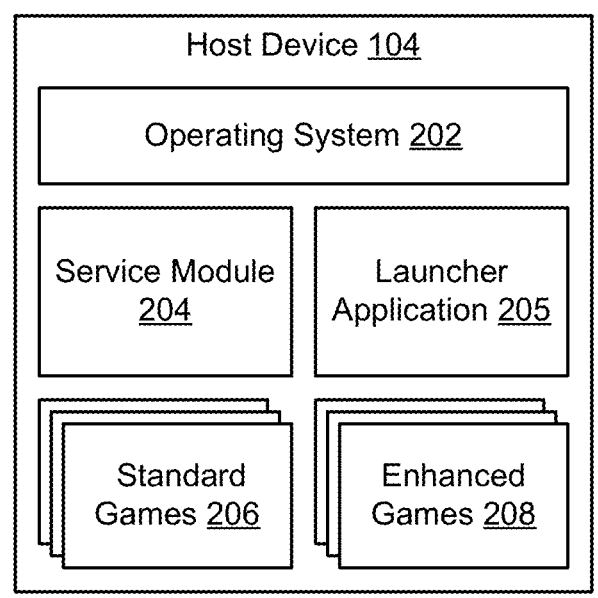
FIG. 2 is a block diagram illustrating components of the host system, according to one embodiment.

FIG. 2 is a block diagram illustrating components of the host device 104, according to one embodiment. The host device 104 includes an operating system 202, a service module 204, a launcher application 205, standard games 206, and enhanced games 208. In other embodiments, the host device 104 includes additional, fewer, or different components, and the functionality of the components described herein may be distributed among the components of the host device 104 in a different manner.

The operating system 202 manages hardware resources of the host device 104 and provides services for applications 206, 208 executing on the host device 104. As described above, the operating system 202 may be a mobile operating system (e.g., the GOOGLE ANDROID operating system or the APPLE IOS operating system) or a desktop operating system (e.g., MICROSOFT WINDOWS). The operating system 202 includes support for one or more communication profiles but may not include support for a communication profile suitable for bidirectional communication with the controllers 108. For example, the GOOGLE ANDROID operating system includes support for a unidirectional Human Interface Device (HID) profile over BLUETOOTH that allows the host device 104 to receive data from a peripheral device but does not allow the host device 104 to send data to the peripheral device.

The service module 204 provides support for additional communication profiles that are more versatile than the communication profiles supported by the operating system 202. For example, the service module 204 may include support for a bidirectional communication profile (e.g., the Serial Port Profile (SPP) over BLUETOOTH) that allows the host device 104 to send data to a peripheral device and receive data from the peripheral device. The service module 204 is described in further detail with reference to FIGS. 4A-4B.

The launcher application 205 executes on the host device 104 to provide a ten-foot user interface (e.g., viewable on the display 106 from ten feet away) that allows a user to launch the games 206, 208 and browse for new games in the marketplace.

The games 206, 208 are software modules capable of being executed on the host device 104. The standard games 206 are games that can be controlled by a controller 108 or some other peripheral device connected over a unidirectional communication profile. Thus, the standard games 206 do not send data back to a controller 108.

The enhanced games 208 are games that can be controlled by a controller 108 connected over a bidirectional communication profile. Thus, the enhanced game 208 can send data back to a controller 108. For example, an enhanced game 208 can send a control signal back to a controller 108 (e.g., to control force feedback devices on the controller or turn on indicator LEDs). An enhanced game 208 can also send user data or game data to be stored on a storage medium within the controller 108.

In one embodiment, a piece of metadata is added to each game 206, 208 to indicate whether the corresponding game 206, 208 is a standard game 206 or an enhanced game 208. In another embodiment, some other method is used to identify standard games 206 and enhanced games 208. For example, enhanced games 208 may be placed in a separate folder, or the service module 204 may maintain a list of enhanced games 208. As another example, the launcher application 205 maintains a list of enhanced applications 208. As still another example, a centralized server maintains a list of enhanced applications 208, and the launcher application 205 compares the list to games 206, 208 on the host device 104 to determine whether each game 206, 208 is a standard game 206 or an enhanced game 208. The launcher application 205 can also be configured to display a visual indicator, such as an icon, next to a graphic for each application to indicate whether the application is a standard application 206 or an enhanced game 208.

Games in the marketplace and on the host device 104 may be filtered based on any of these items of metadata. Some of the filtering may be automatic. For example, the marketplace may automatically filter the games displayed to a user based on the compatible devices and compatible controllers fields so that the user is only shown games that are compatible with the user's host device 104 and connected controller 108. In one embodiment, the launcher application 205 automatically sends an identifier for the host device 104 and connected controller 108 to the backend server after the host device 104 connects to the server. The user may also manually specify a filter. In addition, games may be filtered based on multiple items of metadata at once. For example, a filter may be configured to display games that are (1) classified as shooter games, (2) have an age/content rating of Teen or Everyone, and (3) are compatible with a slingshot controller.

In addition to the filtering that is performed based on the metadata 504, the backend server 402 may also maintain a whitelist of approved games that can be shown on the marketplace. In one embodiment, only whitelisted games are displayed when the launcher application 205 is used to access the marketplace. Implementing a whitelist of games in this manner can allow an administrator of the backend server to block any inappropriate games (e.g., games with pirated content or games with extreme violence and sexual content) from being displayed in the marketplace or in the launcher application 110 on the host device 104.

In addition to the games 206, 208, the host device may include additional applications that are shown in the launcher application 205 and can be controlled by a controller 108, either over a unidirectional connection (similar to a standard game 206) or over a bidirectional connection (similar to an enhanced game 208). Other applications may include, for example, a calendar application, a notepad or text memo application, a streaming video application (e.g., NETFLIX), a virtual world application (e.g., SECOND LIFE), and a map application.

Description of Embodiments for Controller

Figure 3A:
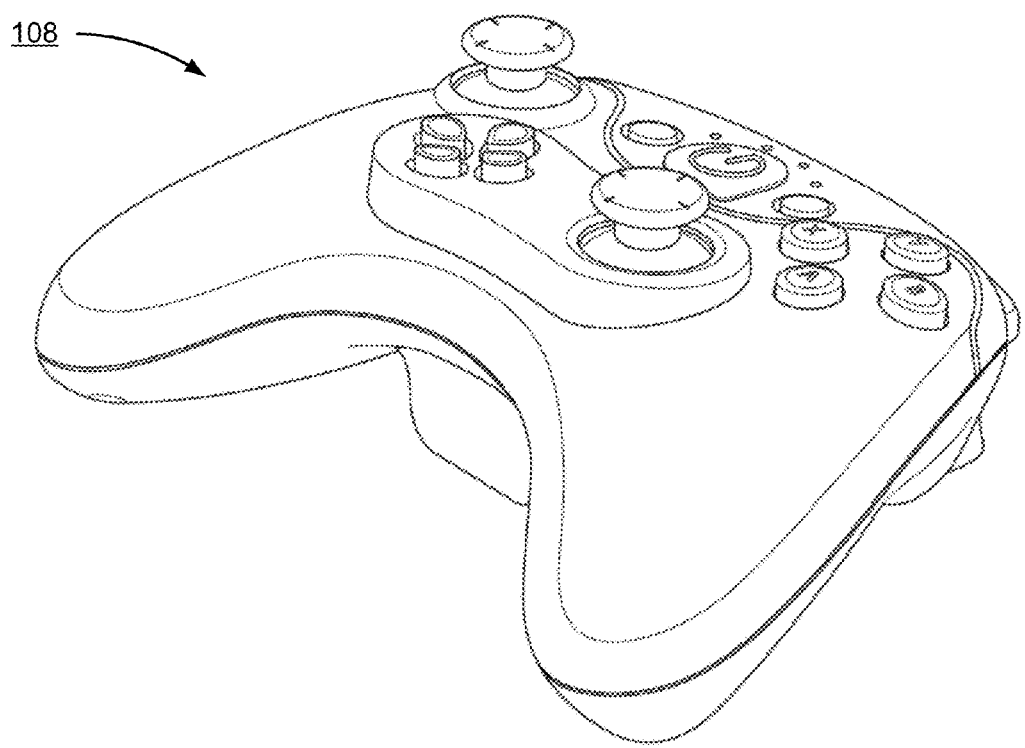
FIGS. 3A-3B illustrate various views of a gamepad controller, according to one embodiment.
Figure 3B:
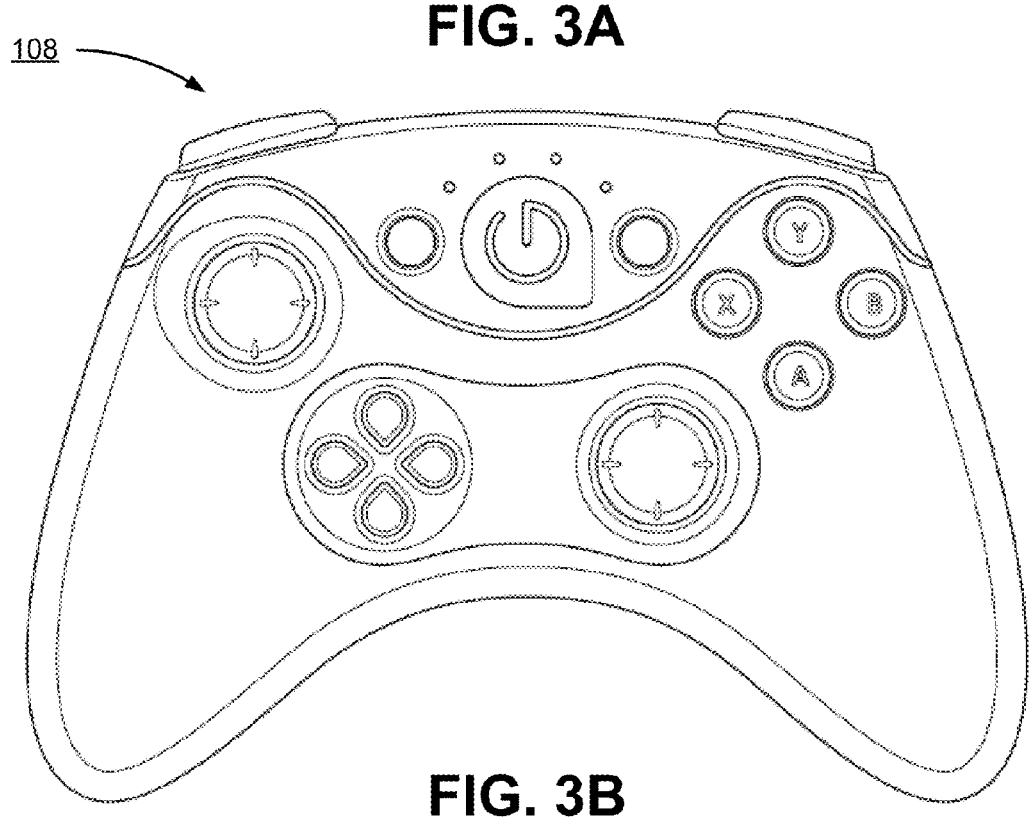

FIGS. 3A-3B illustrate an example external design for a controller 108, according to one embodiment. The controller 108 shown in FIGS. 3A-3B is a gamepad controller that includes a variety of joysticks, buttons, and controls that are suitable for many different kinds of gameplay.

Figure 3C:
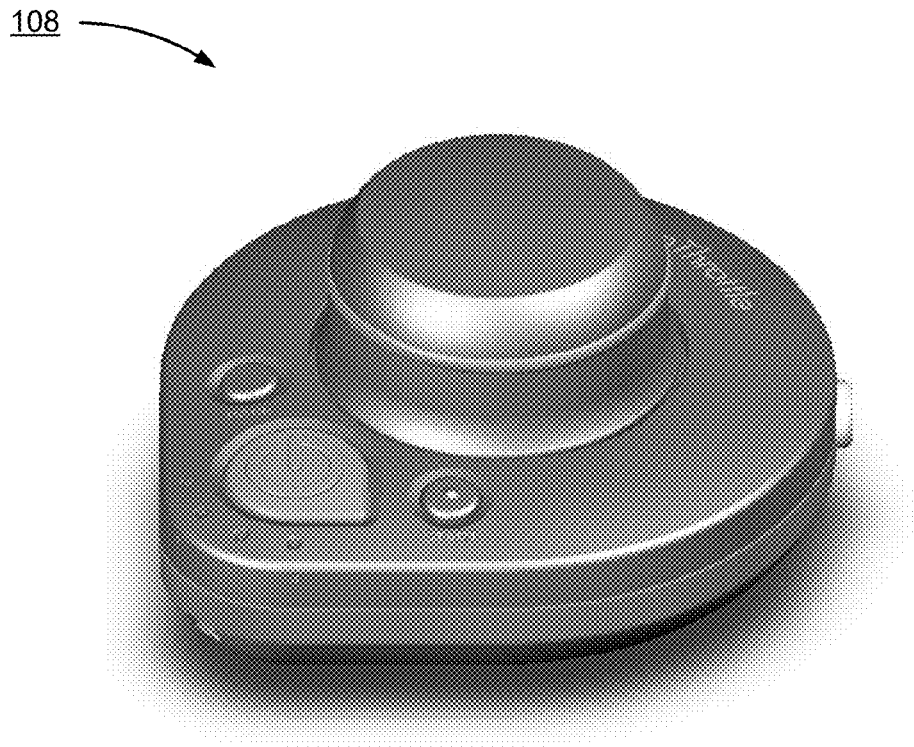
FIGS. 3C-3D illustrate various views of a paddle controller, according to one embodiment.
Figure 3D:
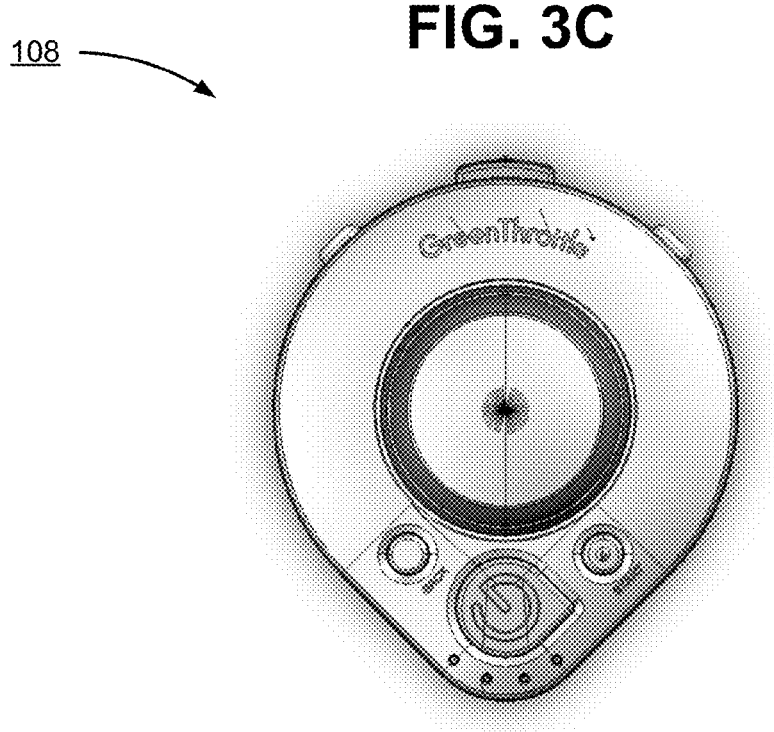

FIGS. 3C-3D illustrates an example external design for a controller 108, according to another embodiment. The controller 108 shown in FIGS. 3C-3D is a paddle controller that includes a knob and a variety of buttons.

Figure 3E:
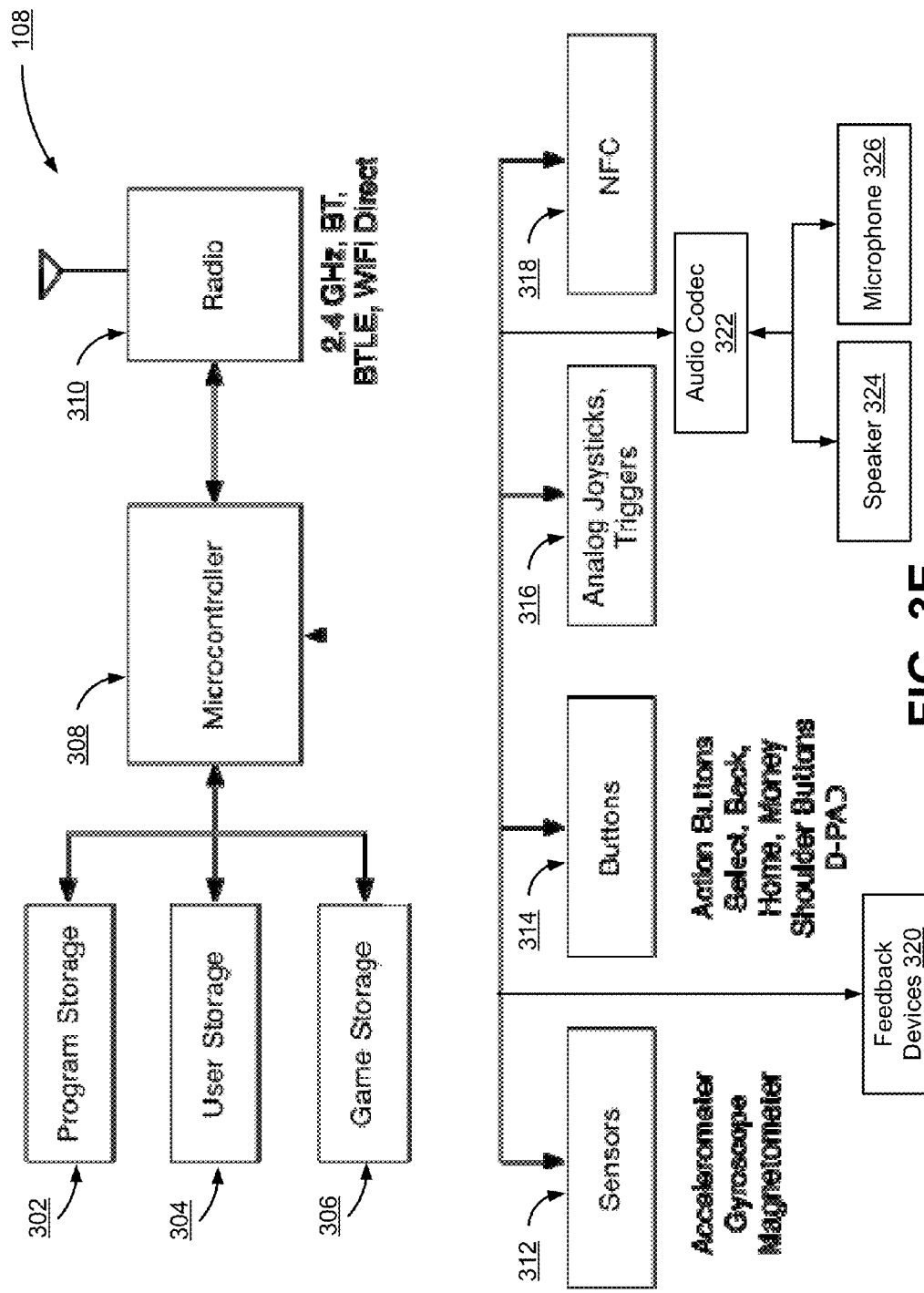
FIG. 3E is a block diagram illustrating components of a controller, according to one embodiment.

FIG. 3E is a block diagram illustrating components of a controller 108, according to one embodiment. As illustrated in FIG. 3E, the controller 108 may store instructions and data (e.g., in the program storage 302, user storage 304, and game storage 306) that can be read by the microcontroller 308 and sent to the host device 104 via the radio 310.

The program storage 302 contains machine-readable instructions that control certain functions of the controller 108. For example, the program storage 302 may include instructions for automatically turning the controller off after a predetermined idle period has elapsed, automatically turning the controller on after detecting motion or a button press, or interpreting the signals from the sensors 312, buttons 314, analog joysticks and triggers 316, and NFC device 318. The program storage 302 may also include one or more addresses (e.g., a Media Access Control address) for the most recent host devices 104 that were successfully connected to the controller 108. In some embodiments, the controller 108 attempts to force a connection to the host device at the most recent stored address at the beginning of the connection process.

The user storage 304 contains user data associated with the user of the controller. For example, the user storage 304 may include profile information for the user, such as contact information (e.g., email address), achievements, parental control settings (e.g., to prevent the user from accessing games with certain age and content ratings), an avatar, and a username or user identifier. The user storage 304 may also contain the user's balance in an online currency that is used to purchase games in the marketplace 116 or items within individual games. In some embodiments, the user storage 304 may be backed up to the backend server 114 so that the data is not lost if the user misplaces or sells the controller 104.

The game storage 306 contains game data associated with individual games 206, 208. For example, the game storage 306 may include a saved game state representing the position and status of the user's character in the game at the end of the user's most recent gaming session. The game storage 306 may also include data describing the user's progress in a game, such as items that the user unlocked or earned, properties (e.g., strength, agility, speed, etc.) of a character belonging to the user, levels that the user has completed, and opponents/enemies that the user has defeated.

There are many benefits to storing the user data and game data on the controller. For example, suppose a user takes his controller to a friend's house and connects to a friend's host device 104 to play a multiplayer game with the friend. The user's avatar and achievements can be loaded from the user storage 304, and the user's items, characters, and game progress can be loaded from the game storage 306. In other words, the user can simply connect his controller and play a multiplayer game with his friend using his own character, items, and other data. In addition, since the data is stored on the controller 108, the data can also be loaded if the friend's host device 104 is not able to connect to the backend server.

The radio 310 establishes a wireless connection to the host device 104. In one embodiment, the radio 310 can simultaneously maintain multiple connections (with different communication profiles) to the host device 104. For example, the radio 310 can be a BLUETOOTH radio that can simultaneously maintain connections over HID and SPP. The radio 310 can alternatively be an RF radio or a WiFi Direct radio.

Instead of sending the state of all buttons at a fixed rate, the controller 108 can be configured to send communication packets when there is a state change in the controller 108. For example, if a button is pressed and held, there will only be a single packet sent. Once the button is released, one more packet is sent to indicate that the button has been released.

A similar procedure can be used for the analog joysticks and triggers 316. For example, suppose an analog trigger can output a value between 0 (not pressed down) and 255 (completed pressed down). The controller 108 can be configured to only send changes in the output value of the trigger. Thus, if the user keeps the trigger completely pressed down for 5 seconds and then slowly releases the trigger, then the controller 108 can send a single packet representing binary 255 (i.e., 0b11111111) at the beginning of the 5 seconds and then send a string of packets representing the change in the output value as the user slowly depresses the trigger. For example, if the next sample of the trigger corresponds to binary 248 then the controller 108 may send a packet representing −7 (i.e., the change in value between the previous sample and the current sample). Alternatively, the controller 108 may send a packet representing binary 248. The controller 108 can be configured to send output data for an analog joystick in the same manner, but with two output values instead of one (e.g., an x value and a y value).

The controller 108 may also implement dead zones by ignoring any analog inputs that fall within a threshold value. For example, although an analog trigger may be designed to output a value of 0 when the trigger is not pressed down, the output of the analog trigger may drift between 0 and a small positive value (e.g., 5) while not pressed down due to process variation when manufacturing the analog trigger or noise in the analog circuit that connects the trigger to a device that samples the output value of the trigger (e.g., an analog to digital converter). To prevent this drift from generating erroneous and undesired game inputs, the controller 108 may be configured to ignore any input values between 0 and 5 from the analog trigger (e.g., by not sending a packet per the method described above). This method for filtering out erroneous inputs may be implemented in hardware or in software (e.g., in the program storage 302) and can also be applied to other peripheral devices of the controller, such as the sensors 312, buttons 314, and analog joysticks. The filtering method may be adapted for use with the other components. For example, if implemented for an analog joystick, the filtering may be expanded to two dimensions and configured to ignore inputs in the middle of the joystick's output range (e.g., between threshold values of 120 and 135) because the default output value of the joystick is 127. In another example, the filtering may also be implemented temporally to ignore any bouncing that may occur when a button 314 is pressed down.

Another feature of the multi-platform gaming system 100 is the ability for a user account to be associated with a specific controller 108. This simplifies game play because the controller 108 is identified by the system 100 and the user is instantly logged into the system 100 or the game. High scores, game state, and achievements are all tied to and stored on the controller. If a user plays games at other locations, the user can take his controller, pair it with a host device at the other location, and continue playing with the user's character intact and with all of its weapons and power-ups.

Alternate embodiments of the controller 108 can contain Near Field Communication 318 (NFC) so that the user can pair the controller 108 to the host device 104 by simply bringing the controller 108 near the host device 104. After establishing the connection, the user's profile information can be loaded either from the user information 304 on the controller 108 or by retrieving the information from the back-end server 114.

In some embodiments, the controller 108 also includes feedback devices 320 that provide force feedback to the user. For example, the feedback devices 320 can include one or more vibration motors that can cause the controller to vibrate. In embodiments where the controller 108 includes a knob (e.g., the paddle controller shown in FIGS. 3C-3D), the feedback devices 320 can further include a device that changes the torque required to rotate the knob. The feedback devices 320 can also include other output devices, such as indicator LEDs (e.g., to indicate a player number that was assigned to the controller 108) or a display on the controller 108.

The controller 108 can additionally include an audio codec 322 that supports one or more audio input and audio output devices. For example, the audio codec 322 can support a speaker 324 and a microphone 326. The audio codec 322 can also support other devices for capturing and generating audio, such as an external microphone jack, a line in jack, and a headphone jack.

Service Module and Dynamic Switching of Communication Profiles

Figures 4A, 4B:
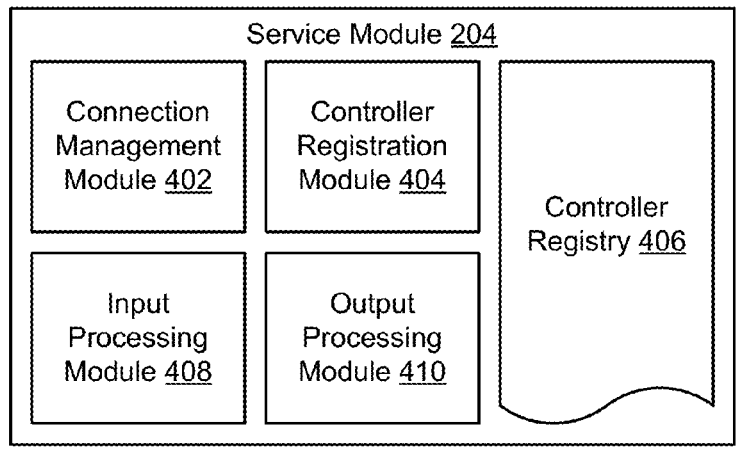
FIG. 4A is a block diagram illustrating components of the service module, according to one embodiment.
FIG. 4B is illustrates an example of a controller registry, according to one embodiment.

FIG. 4A is a block diagram illustrating components of the service module 204, according to one embodiment. In the illustrated embodiment, the service module 204 includes a connection management module 402, a controller registration module 404, a controller registry 406, an input processing module 408, and an output processing module 410. In other embodiments, the service module 204 may include additional, fewer, or different components, and the functionality described herein may be distributed among the components in a different manner.

In one embodiment, the service module 204 runs in the background on the host system 104. For example, the service module 204 runs in the background on a host device 104 that runs a version of the GOOGLE ANDROID operating system. However, some mobile operating systems, such as some versions of APPLE IOS, allow a third-party application to run in the foreground but do not allow third-party services to run in the background. In embodiments where the host device 104 runs on such an operating system, the functions of the service module 204 may be compiled into the launcher application 205 and into each enhanced game 208. In these embodiments, communication packets are directly forwarded from the Bluetooth stack to the foreground application (i.e., the launcher 205 or an enhanced game 208) instead of to a service module.

The connection management module 402 establishes, manages, and terminates bidirectional connections between the host device 104 and controllers 108. The connection management module 402 establishes a bidirectional connection with a controller 108 (e.g., a BLUETOOTH connection over the Serial Port Profile) when the service module 204 is launched. In another embodiment, the service module 204 is launched when the host device 104 is booted up, and the service module 204 establishes a bidirectional connection with a controller 108 when the service module 204 detects that the user has provided input to launch an enhanced game 208. After a bidirectional connection has been established with a controller 108, the connection management module 402 can also send a command to the controller 108 (e.g., via the output processing module 410) to mute a unidirectional connection that was previously established between the controller 108 and the host device 104. The details and benefits of muting a unidirectional connection are described in further detail below with reference to FIG. 5.

The controller registration module 404 registers controllers 108 that have been connected via a bidirectional connection by generating new entries in the controller registry 406. An embodiment of the controller registry 406 is shown FIG. 4B. In this embodiment, the controller registration module 404 generates a new entry in the controller registry by assigning a controller number 452 to the controller 108, associating the controller number 452 with a device identifier 454 for the controller 108, and saving information identifying the type of controller 456 that was connected. In one embodiment, the operating system 202 assigns the device identifier 454 to a controller 108 when a unidirectional connection is established with the controller. After the entry is generated, the controller registration module 404 stores the entry in the controller registry 406. Each entry in the controller registry can also include a connection status 458. When the corresponding controller 108 is connected over a bidirectional connection, the connection status 458 indicates that the controller is connected. Similarly, the controller registration module 404 changes the connection status 458 to not connected when the bidirectional connection is terminated. The controller registration module 404 can also delete the entry in the registry 406 upon receiving a request from the user to delete the entry.

Referring back to FIG. 4A, the input processing module 408 receives controller input from a connected controller 108 and uses data in the controller registry 406 to generate game input that can be passed to an enhanced game 208 or to some other component of the host device 104. In one embodiment, the controller 108 sends controller input to the host device 104 in a packet structure in which each packet includes a header, a payload length, one or more bytes of data, a battery indicator, and a sequence byte. In this embodiment, the input processing module 408 receives the packet and the device identifier of the controller 108 and uses the controller registry 406 to map the device identifier to the controller number. After the determining the controller number, the module 408 passes game input to the enhanced game 208 currently running in the foreground. The game input includes the controller number and one or more messages representing the data bytes. For example, if the data bytes indicate that the left button on the controller is pressed, the messages include an indication that the left button has been pressed. Alternatively, the game input can be passed to some other component of the host device 104.

In one embodiment, the input processing module 408 uses the type identifier 456 to interpret the controller input received from the controller 108 and map the controller input to game input in a corresponding manner. For example, if the data bytes received from a paddle controller may include a discrete value indicating a quantized rotational position of the knob, the input processing module 408 can track changes in the discrete value to determine an angular velocity of the knob and output the angular velocity as one of the messages in the game input. Alternatively, the input processing module 408 can merely transform the discrete value into a more convenient form. For example, the input processing module 408 can calculate an angular position in degrees based on the discrete value (which may be quantized into different angular units). The input processing module 408 can transform data bytes representing other input sensors in a similar manner. For example, if the data bytes representing the position of an analog joystick give the position in Cartesian coordinates, the input processing module 408 can transform the Cartesian coordinates into polar coordinates and output the polar coordinates as one of the messages in the game input.

The input processing module 408 can also operate in a compatibility mode that maps input from non-conventional controllers to conventional inputs. For example, if the user presses the right arrow button on a gamepad controller (e.g., the gamepad shown in FIGS. 3A-3B) while playing an enhanced game 208, the input processing module 408 maps this button press to a message indicating that the right arrow button has been pressed. However, if a paddle controller (e.g., the paddle shown in FIGS. 3C-3D) is connected instead and the user rotates the knob on the paddle controller clockwise, the input processing module 408 can be configured to map the clockwise knob rotation to the same message indicating that the right arrow button has been pressed. In one embodiment, the game input includes this compatibility message in addition to a second knob-specific message indicating the angular position or angular velocity of the know. If the enhanced game 208 is configured to receive knob-specific input, then the game 208 uses the knob-specific message. Otherwise, the game 208 uses the compatibility message. Thus, this mapping function of the input processing module 408 can advantageously allow different types of controllers 108 (with different buttons, joysticks, and other input hardware) to control the same enhanced game 208 without any significant modifications to the way the game 208 handles game input received from the service module 204.

The input processing module 408 can also pass other portions of each packet to components of the host device 104. For example, the battery indicator byte and the corresponding controller number can be passed to a battery management module (not pictured) within the service module 204 that monitors the voltage levels of connected controllers and displays low battery warnings when the battery voltage on a connected controller drops below a threshold voltage. The input processing module 408 may also check the sequence byte of a received packet against the sequence byte of the previous packet to determine whether any packets were lost.

The output processing module 410 receives game output (e.g., a request to send data or a command to a controller), uses data in the controller registry 406 to process the game output into controller output, and sends the controller output to the appropriate controller. In one embodiment, game output includes the output data to be sent and the controller number for the destination controller. The game output can be received from an enhanced game 208, a component of the service module 204 (e.g., the connection management module 402), or some other component of the host device 104. The controller output sent to the controller can be a command to control one of the hardware devices on the controller 108 (e.g., one of the feedback devices 320). The controller output can also be program data, user data, or game data to be stored in the appropriate storage block 302, 304, 306 on the controller. In addition, the controller output can be an audio signal or data to be used by an NFC device on the controller.

After receiving game output, the output processing module 410 accesses the controller registry to map the controller number to the channel on which the controller is connected. The output processing module 410 packetizes the output data and sends the output data over the channel to the controller.

Figure 5A:
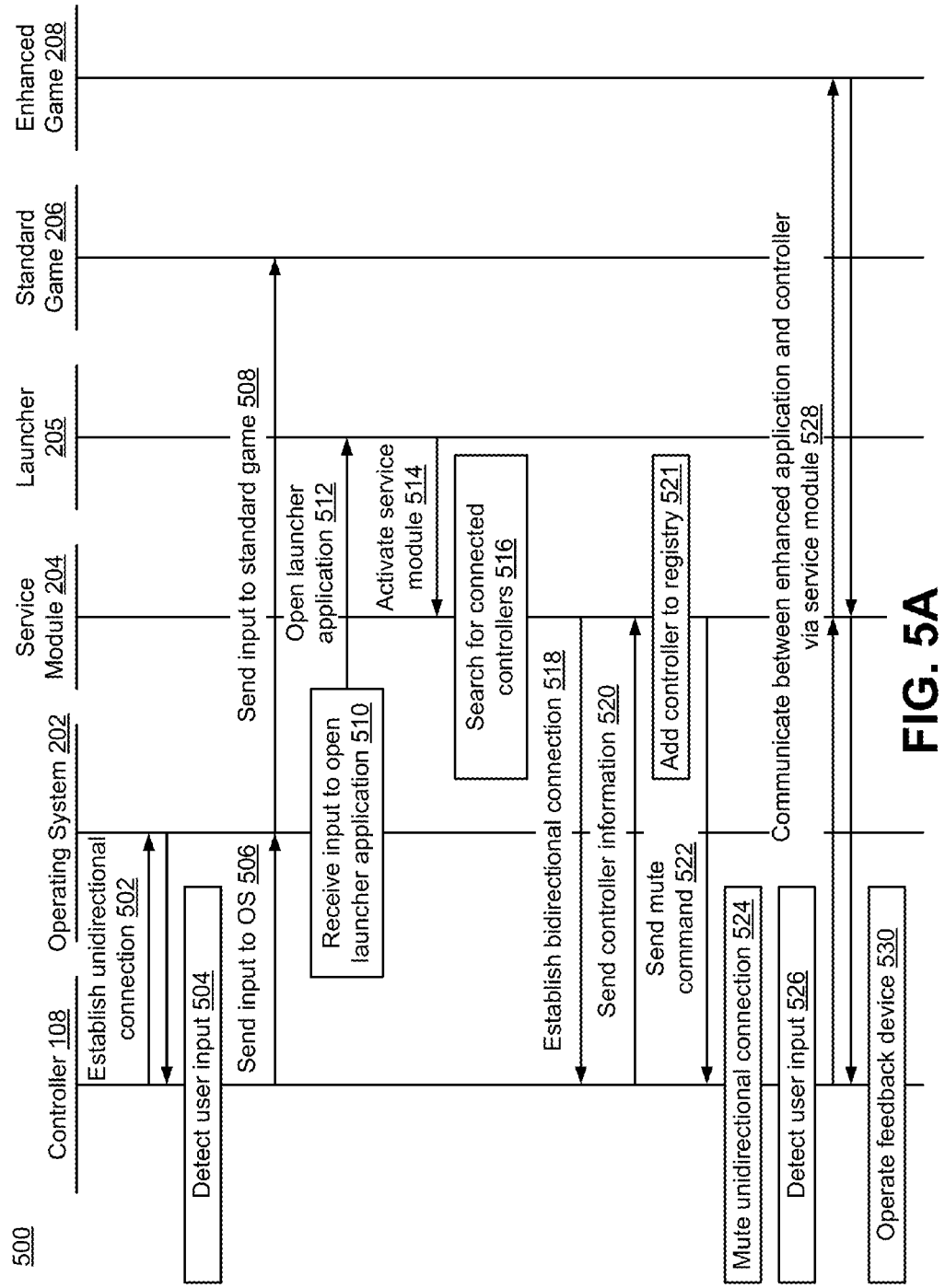
FIG. 5A is an interaction diagram illustrating an example process for establishing a connection to a controller with a bidirectional communication profile, according to one embodiment.

FIG. 5A is an interaction diagram illustrating an example process 500 for establishing a connection between a controller 108 and a host device 104 over a bidirectional communication profile. The process 500 begins when the controller 108 establishes 502 a first connection using a unidirectional communication profile with the operating system 202. As described above, typical mobile operating systems 202 (e.g., the ANDROID operating system) provide support for unidirectional connection profiles (e.g., the Human Interface Device profile).

After the first connection is established 502 between the controller 108 and the operating system 202, the controller 108 can detect 504 user input on the various buttons, joysticks, triggers, and sensors on the controller 108. The user input is sent 506 to the operating system 202 over the unidirectional connection and can be used to interact with the operating system itself (e.g., navigating a user interface of the operating system). Alternatively, the operating system 202 can send 508 the user input to a standard game 206 executing in the foreground so that the user interacts with the standard game 206 using the controller 108.

The operating system 202 opens 512 launcher application 208 after receiving 510 an input to do so. The input to open the launcher application 202 may be received 510 from the controller 108 (e.g., the user uses the controller to navigate to and select the launcher application 510). Alternatively, the input to open the launcher application 202 may be received 510 from a different input device, such as a touchscreen built into the host device 104 or a different peripheral connected to the host device 104. After the launcher application 205 is opened 512, the launcher application activates 514 the service module 204. In another embodiment, the operating system 202 opens both the service module 204 and the launcher application 205 after receiving 510 the launching input. In still another embodiment, the functions of the service module 204 are compiled into the launcher application 205 and each enhanced game 208. As described above, this may be advantageous in embodiments when the host device 104 runs an operating system 202 that does not allow third-party services to execute in the background (e.g., IOS).

The service module 204 searches 516 for connected controllers and establishes 518 a connection with the controller 108 using a bidirectional communication profile. In one embodiment, the connection is a BLUETOOTH connection using the Serial Port Profile (SPP). After the connection is established 518, the controller 108 sends 520 controller information to the service module 204. The controller information may include, for example, a type identifier for the controller 108 (e.g., whether the controller 108 is a gamepad controller, a paddle controller, or some other type of controller), a version of the firmware installed on the controller 108, and a list of sensors, buttons, joysticks/triggers, feedback devices, and other input/output devices on the controller 108. In one embodiment, the service module is activated 514 when the host device 104 is booted up, and the service module 204 performs the steps 516 thorough 521 before the launcher application is opened 512.

The service module 204 uses the received controller information to add 521 the newly-connected controller 108 to the controller registry 406. As described above, the service module 204 can also assign a controller number to the controller 108 and associate the controller number with the device identifier assigned to the controller 108. The module 204 can then create a registry entry that includes the controller number, device identifier, and controller type and add 521 the new entry to the controller registry 406.

When the launcher 205 or an enhanced game 208 is launched, the service module 204 sends 522 a mute command to the controller 108, and the command causes the controller 108 to mute 524 the unidirectional connection that was previously established. Muting 524 the unidirectional connection prevents the controller from sending two copies of a user input to the host device 104 (e.g., one over the unidirectional connection and one over the bidirectional connection).

Thus, after the controller 108 receives 526 input from the user (e.g., when the user presses a button, manipulates a joystick, or moves the controller in a manner detectable by the sensors), the controller 108 sends controller input to the host device 104 over the bidirectional connection but not over the unidirectional connection. After receiving the controller input, the input processing module 408 of the service module 204 uses the controller registry 406 to generate game input based on the controller input and passes the game input to the launcher application 205. The user can use the launcher 205 to launch an enhanced game and use the controller 108 to interact with the enhanced game 208 in the same manner.

As described above, the game input generated by the input processing module 408 includes a controller number for the controller 108 that sent the corresponding controller input. This allows an enhanced game 208 to differentiate between inputs from different controllers, which advantageously allows for a multiplayer game to played on a single host device 104.

The launcher 205 or enhanced game 208 can also pass data back to the controller 108 by sending the data to the service module 204. For example, the enhanced game 208 can send a signal to the controller 108 to operate 530 one of the feedback devices 320. In addition, the enhanced game 208 can send audio to be played back by the speaker 324 or data for the NFC device 318. The enhanced game 208 can also send user data or game data to the controller to be saved on the user storage 304 or game storage 306. As described above with reference to the service module 204, the output processing module 410 receives game output from the enhanced game 208 and sends controller output to the controller 108.

Figure 5B:
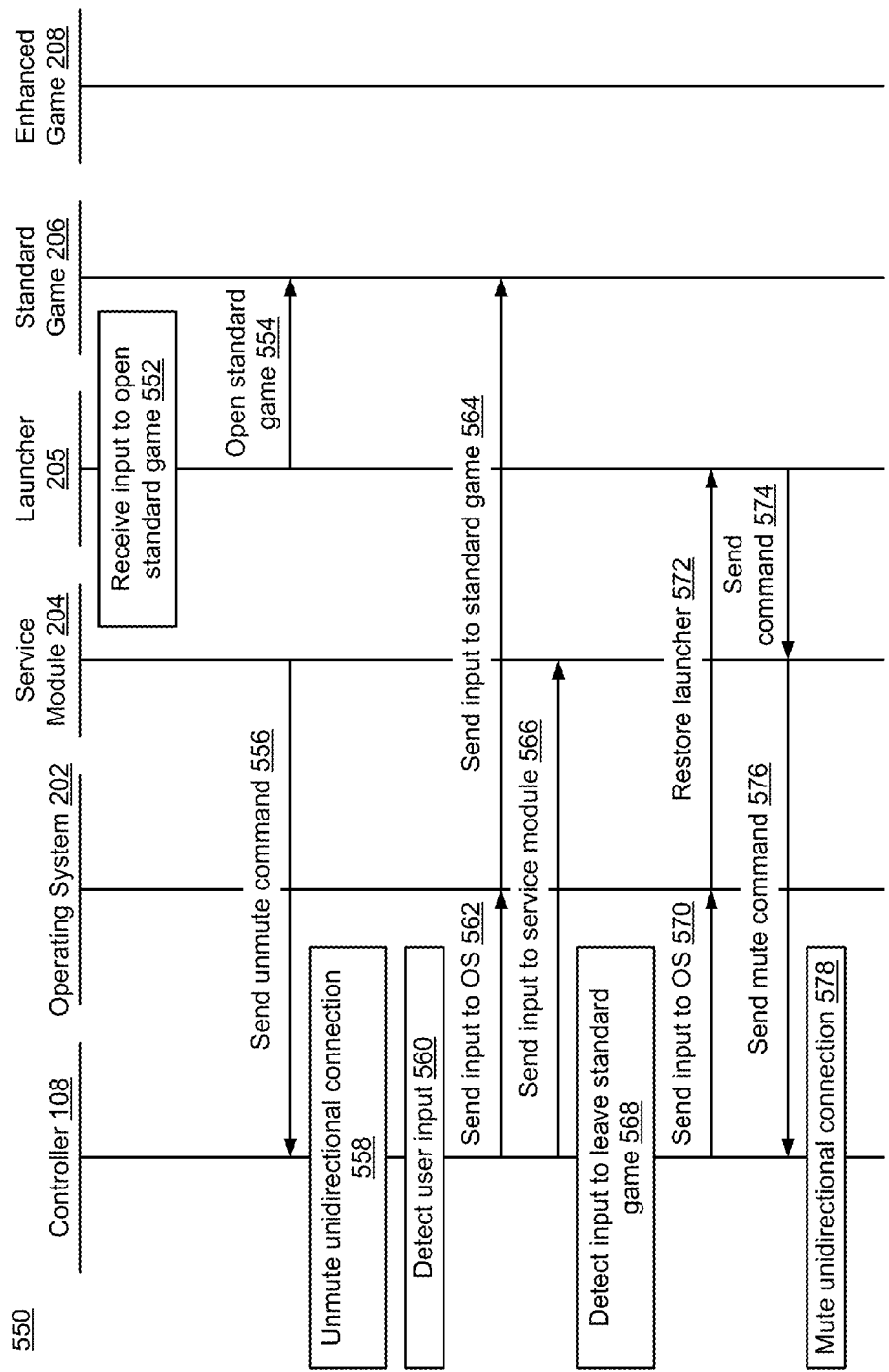
FIG. 5B is an interaction diagram illustrating an example process for dynamically switching between communication profiles, according to one embodiment.

FIG. 5B is an interaction diagram illustrating an example process 550 for dynamically switching between a bidirectional communication profile and a unidirectional communication profile, according to one embodiment.

At some point after the process 500 of FIG. 5A establishes a bidirectional connection and mutes the unidirectional connection, the launcher 205 receives 552 an input to open a standard game 206. For example, the user uses the controller 108 to navigate through a user interface of the launcher application 205 to select and launch a standard game 206. The launcher 205 opens 554 the standard game 206.

After the launcher 205 receives 552 an input to open a standard game 206, the service module 204 sends 556 an unmute command to the controller 108 that causes the controller to unmute 558 the unidirectional connection. As a result, any subsequent user inputs detected by the controller 108 are sent to the host device twice—once over the unidirectional connection and once over the bidirectional connection.

When the controller 108 detects 560 a user input after unmuting 558 the unidirectional connection, the controller 108 sends 562 the input to the operating system 202 over the unidirectional connection, and the operating system 202 sends 568 the input to the standard game 206. The controller 108 also sends 570 the same input to the service module 204, but the standard game 208 is not capable of receiving the resulting game input from the service module 204, so sending 570 the input to the service module 204 does not affect the standard game 208. Although the process 560 through 566 of sending the user input to the standard game 206 is only shown once in FIG. 5B, this process 560 through 566 can be repeated multiple times as the user interacts with the game 206 using the controller 108.

When the controller 108 detects 568 an input to leave the standard game 206, the input is sent 570 to the operating system in the same manner as the previous inputs. After receiving the input, the operating system 202 restores the launcher 572 as the foreground application.

After being restored, the launcher 205 application sends 574 a command to the service module 204 that causes the service module 204 to send 576 another mute command to the controller 108. As a result, the controller 108 mutes 578 the unidirectional connection, and subsequent inputs detected by the controller 108 are sent over the bidirectional connection but not over the unidirectional connection. The controller 108 can once again engage in bidirectional communication via the service module 204 with the launcher 205 or an enhanced game 208.

This process 550 of switching between a bidirectional communication profile and a unidirectional communication profile for the connection between the controller 108 and the host device 104 is advantageous because it allows the controller 108 to be compatible with standard games 206 that are not configured to interact with the controller 108 via a bidirectional connection and the service module 204. In addition, since the service module 204 manages the switching in the background, the switching process 550 is transparent to the user as the user opens and closes standard games 206 using the launcher application 206.

Computing Machine Architecture

Figure 6:
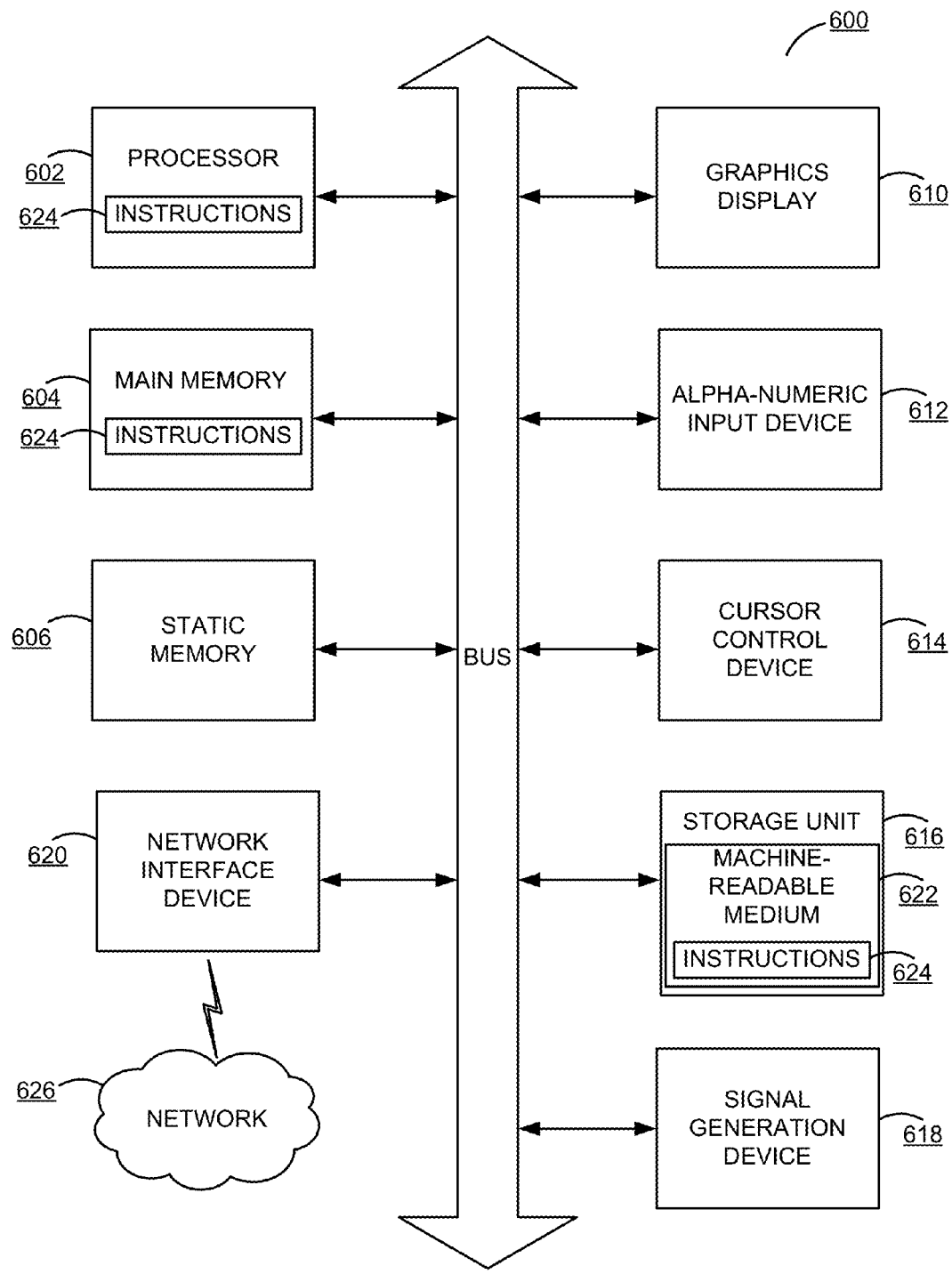
FIG. 6 illustrates one embodiment of components of an example machine able to read instructions from a machine-readable medium and execute them in a processor.

Referring now to FIG. (FIG. 6, a block diagram illustrates components of an example machine able to read instructions from a machine-readable medium and execute them in a processor (or controller). The example machine illustrated in FIG. 6 may be used, for example, may include one or more components that make up a configuration of the host device 104 or the controller 108 in the system illustrated in FIG. 1. Specifically, FIG. 6 shows a diagrammatic representation of a machine in the example form of a computer system 600 within which instructions 624 (e.g., software) for causing the machine to perform any one or more of the methodologies discussed herein may be executed (e.g., those described with reference to FIGS. 2, 4A, 4B, 5A and 5B). In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Dynamic Selection of Controller Operating Mode

Most conventional controllers that can be connected to a host device 104 over a unidirectional communication profile (e.g., the BLUETOOTH HID profile) have a preconfigured key mapping that maps each button on the controller to a key code. The controller thus outputs the mapped key code when the corresponding button is pressed. For example, the up, left, down, and right directional buttons on a conventional controller may be mapped to the W, A, S, and D key codes, respectively. This type of preconfigured mapping between controller buttons and key codes on a conventional controller allows the conventional controller to be recognized as a gamepad by the host device's operating system 202. Standard games 206 can then be configured with a control scheme that generates in-game commands that are consistent with the key mapping of the conventional controller. For example, the control scheme of a standard game 206 may issue commands to move an on-screen character up, left, down, and right when the W, A, S, and D key codes, respectively, are received. This control scheme would allow the standard game 206 to be controlled by the conventional controller of the previous example.

One drawback to this approach is that the preconfigured key mappings may not be consistent between different conventional controllers. For example, a first type of conventional controller may map directional buttons to the W, A, S, and D key codes as described above, while a second type of conventional controller may map directional buttons to the I, J, K, and L key codes or the arrow key codes. As a result, a standard game that is configured with a particular control scheme (i.e., to be compatible with the first type of controller) may not be compatible with the second type of controller.

In some embodiments, the controller 108 described above with reference to FIGS. 1 and 3A-3E is capable of dynamically switching between different operating modes, with each operating mode causing the controller to generate outputs with a different key mapping. In these embodiments, when the launcher application 205 is used to launch a standard game 206, the launcher 205 also dynamically configures the controller 108 to use an operating mode that is compatible with the control scheme of the standard game 206. This allows the controller 108 to emulate the output of several different types of conventional controllers, which advantageously makes the controller 108 compatible with a broader range of standard games.

In addition to defining a key mapping, an operating mode can additionally or alternatively configure a controller 108 to emulate other behavior. For example, an operating mode can also configure a joystick of the controller 108 to generate the same output as a mouse or other pointing device connected over the BLUETOOTH HID protocol.

Figure 7A:
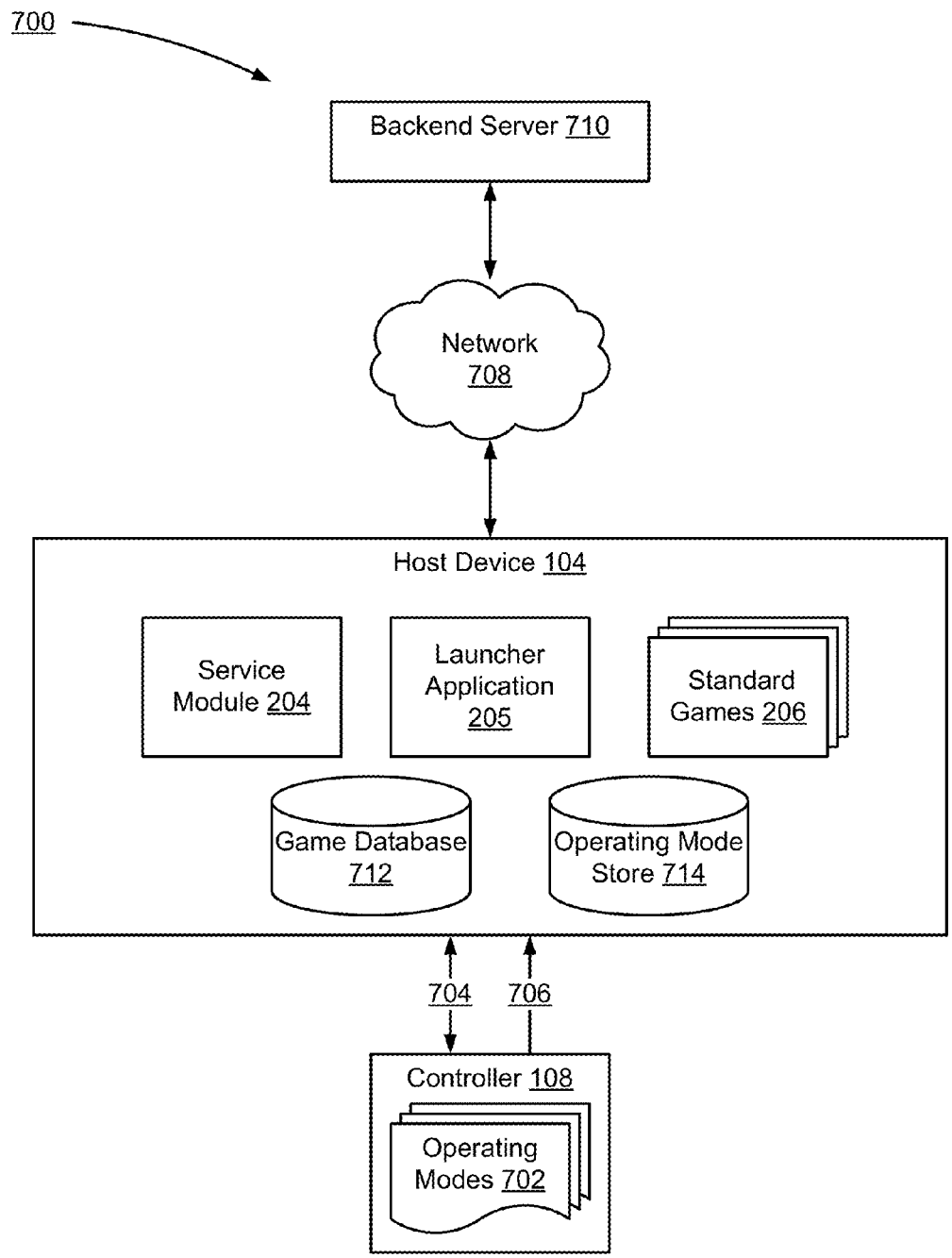
FIG. 7A is a block diagram illustrating a system environment for dynamically switching between controller operating modes, according to one embodiment.
Figure 7B:
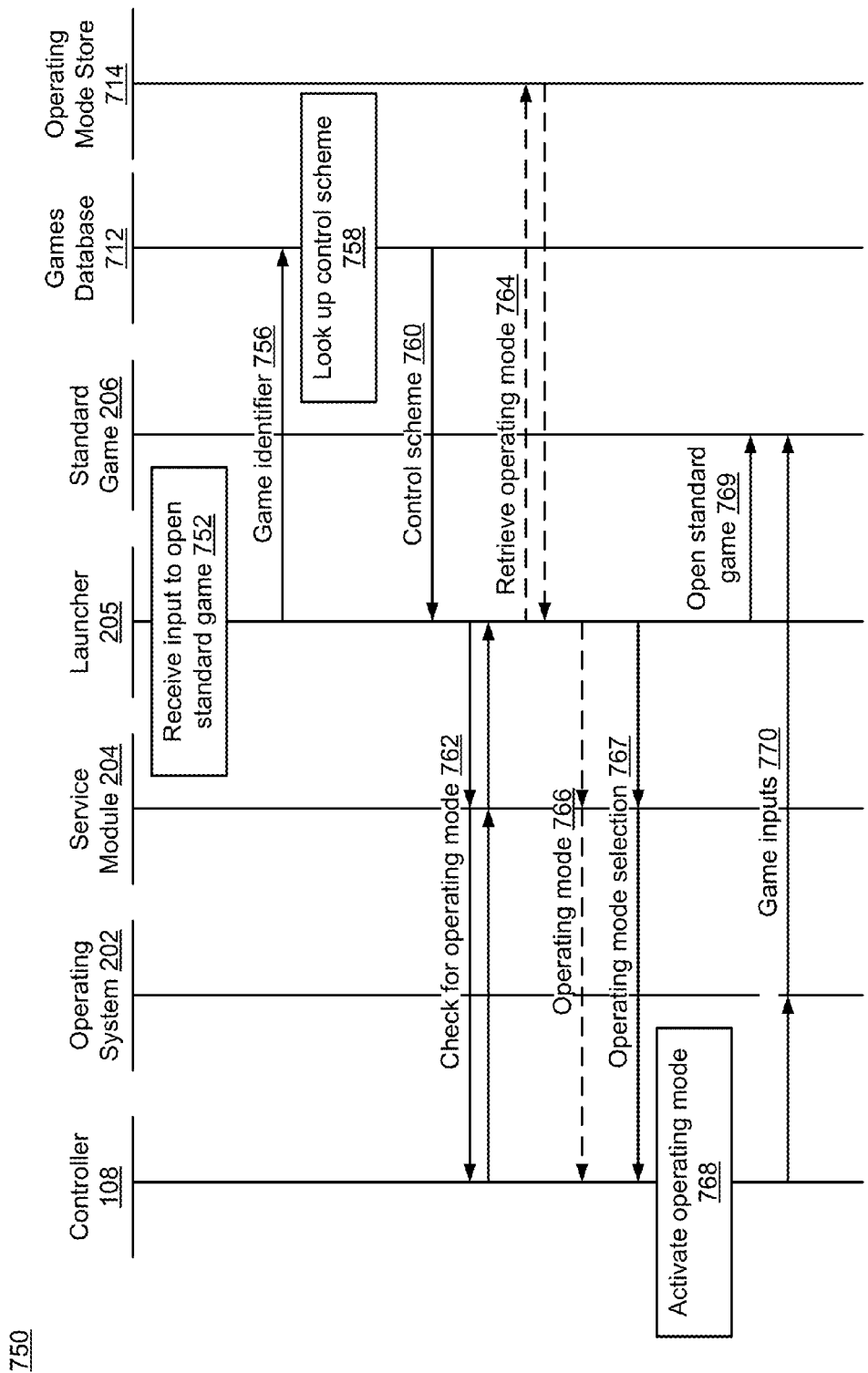
FIG. 7B is an interaction diagram illustrating a process for dynamically switching between controller operating modes, according to one embodiment.

FIGS. 7A and 7B illustrate a system environment 700 and a process 750, respectively, for dynamically switching the controller to an appropriate operating mode for a standard game 206, according to one embodiment. For ease of description, the process 750 shown in FIG. 7B will be described in conjunction with the components shown in FIG. 7A.

The process 750 begins when the launcher 205 receives 752 an input to launch a standard game 752. As described above, the input may be received from the controller 108, from a touchscreen or other integrated input device of the host device 104, or from some other input device connected to the host device 104.

After receiving 752 the input, the launcher 205 sends 756 an identifier for the standard game 206 to the Game Database 710. The games database 712 is a database that stores metadata for games compatible with the launcher application 205 locally on the host device 104. During installation of a game the games database 712 retrieves metadata for the game from the back end server 710. One of the items of metadata stored for each game is the control scheme of the game. The launcher application 205 accesses the games database 712 to look up 758 the control scheme of the standard game 206 that was launched. The control scheme 760 identifies a compatible operating mode for the controller 108.

The launcher 205 checks 762 the controller 108 to determine whether the identified operating mode is already stored on the controller 108. In general, operating modes 702 can be stored in the program storage 302 of the controller 108. In one embodiment, the launcher 205 sends an identifier for the operating mode over the bidirectional connection 704 via the service module 204, and the controller 108 sends a Boolean value back to the launcher over the bidirectional connection 704 indicating whether the identified operating mode is stored on the controller 108.

If the operating mode is not already stored on the controller 108, the launcher 205 retrieves 764 the operating mode from the operating mode store 714 on the host device 104. The operating mode store 714 includes operating modes for the games whose metadata is in the game database 712. During installation of a game the operating mode store 714 retrieves operating modes for a game from the back end server 714. The operating mode store 714 may even check the back end server 710 for updates regarding operating modes at regular time intervals. After retrieving the operating mode 764, the launcher 205 sends 766 the operating mode to the controller 108 over the bidirectional connection 704 via the service module 204, and the controller 108 saves the operating mode in the program storage 302.

In one embodiment, the launcher 205 also maintains a cache of recently-retrieved operating modes 764. In this embodiment, if it is determined that the operating mode is not already stored on the controller 108, the launcher 205 checks the operating mode cache for the operating mode before retrieving the operating mode from the backend server 710. This may be advantageous, for example, if the same operating mode is being saved onto multiple controllers 108. The cache may also include the entries in the game database 712 corresponding to the standard games 206 that are stored on the host device 104. In this case, the launcher also accesses the cache before sending 756 the game identifier to the backend server 710 to look up 758 the control scheme of the game.

After the operating mode is saved on the controller 108, or after determining that the operating mode is already stored on the controller 108, the launcher 205 sends 767 a selecting command to the controller 108 to select the operating mode. The launcher 205 also opens 769 the standard game 206 that was launched. The selecting command causes the controller 108 to activate 768 the operating mode, and the controller 108 begins sending game inputs 770 over the unidirectional connection 706 to the game. Since the launcher 205 is able to determine and select the appropriate operating mode for the standard game, the game inputs 770 sent after the operating mode is activated 769 are compatible with the control scheme of the standard game 206.

Although the process 750 of FIG. 7B was described with respect to games, the process 750 can also be used to improve interactivity with other types of standard applications that are capable of receiving input over the unidirectional protocol. For example, when the user performs an action in the launcher that causes an Application Store application to open on the host device (e.g., the GOOGLE PLAY STORE or the AMAZON APPSTORE), the process 750 can be used to switch the controller 108 to a mode of operation in which one of the joysticks generates the same output as an external pointing device, as described above. Since Application Store applications are typically configured to be controllable by an external pointing device, this allows the user to navigate the Application Store application using the controller. This is especially advantageous if the host device 104 is positioned so that interacting with the Application Store in the traditional manner (e.g., using the touchscreen of the host device 104) is undesirable to the user. For example, the host device 104 may be placed next to the display 106 (and connected to the display 106) while the user is sitting on a couch, which would normally require the user to get up and walk to the host device 104 to interact with the touchscreen.

Additional Configuration Considerations

In addition to the process 550 of dynamically switching between communication profiles, the system described above can also be configured to simultaneously use the unidirectional connection and the bidirectional connection to interact with a peripheral device (e.g., as described in the process 750 of FIG. 7B). In this configuration, the peripheral device operates in an enhanced mode in which the peripheral device sends data to the host device over the unidirectional connection and receives data from the host device over the bidirectional connection. For example, the controller 108 sends detected user inputs to the host device 104 over the unidirectional connection and the operating system 202 sends the inputs to a standard game 206. Meanwhile, the service module 204 is configured so that the standard game 206 or the operating system 202 recognizes it as an audio output device and sends audio output to the service 204. The service module 204 sends the audio output to the controller 108 over the bidirectional connection and the controller 108 plays back the audio with the speaker 324 or a headset plugged into an audio output jack on the controller.

Although the description presented above was described with reference to game controllers 108 and game applications 206, 208, the process 500 of establishing connections with unidirectional and bidirectional communication profiles and the process 550 of dynamically switching between the communication profiles can be applied to any combination of peripheral devices and applications. Thus, different peripheral devices (e.g., keyboards, mice, trackpads, headsets, etc.) may be used in place of the controllers 108, and the peripheral devices may be used to control non-game applications via the unidirectional and bidirectional connections. For example, a mouse with a built-in vibration motor may be used to control a maps application via a bidirectional connection. In this example, the maps application can be configured to send feedback to the mouse (e.g., by causing the mouse to vibrate when the user attempts to increase the zoom level past a maximum zoom level). As another example, a multimedia application (e.g., NETFLIX) can be configured to send one or more audio channels to a remote control with an audio output jack, thus allowing a user to listen to the audio track of a video using a headset connected to the remote control. Similarly, the switching process 550 may be used to transition from the maps application of the previous example to a notepad application that merely receives text input from a connected keyboard and does not send any data back to the keyboard.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

What is claimed is:

1. A method of communication between a host device and a peripheral device, the method comprising:
    establishing a first connection between the host device and the peripheral device, the first connection allowing unidirectional transfer of data from the peripheral device to the host device;
    establishing a second connection between the host device and the peripheral device, the second connection allowing bidirectional transfer of data between the peripheral device and the host device;
    receiving data from the peripheral device over the first connection;
    sending data to the peripheral device over the second connection; and
    receiving over the first connection, a request to launch an enhanced application, the enhanced application configured to receive input data from the peripheral device and further configured to send output data to the peripheral device.

2. The method of claim 1 further comprising responsive to receiving the request to launch the enhanced application, establishing the second connection between the host device and the peripheral device.

3. The method of claim 1, wherein the first connection is configured to follow a Human Interface Device (HID) protocol.

4. A method of communication between a host device and a peripheral device, comprising:
    establishing a first connection between the host device and the peripheral device, the first connection allowing unidirectional transfer of data from the peripheral device to the host device;
    establishing a second connection between the host device and the peripheral device, the second connection allowing bidirectional transfer of data between the peripheral device and the host device;
    receiving data from the peripheral device over the first connection;
    sending data to the peripheral device over the second connection; and
    sending, to the peripheral device over the second connection, a command for causing the peripheral device to mute the first connection, the muting causing the peripheral device to stop sending data over the unidirectional connection.

5. The method of claim 4, wherein the first connection is configured to follow a Human Interface Device (HID) protocol.

6. A method of communication between a host device and a peripheral device, comprising:
    establishing a first connection between the host device and the peripheral device, the first connection allowing unidirectional transfer of data from the peripheral device to the host device;
    establishing a second connection between the host device and the peripheral device, the second connection allowing bidirectional transfer of data between the peripheral device and the host device;
    receiving data from the peripheral device over the first connection;
    sending data to the peripheral device over the second connection; and
    receiving, over the second connection, a request to launch a standard application, the standard application configured to receive input data from the peripheral device.

7. The method of claim 6 further comprising responsive to receiving the request to launch the standard application, sending, to the peripheral device over the second connection, a command for causing the peripheral device to unmute the first connection.

8. The method of claim 6, wherein the first connection is configured to follow a Human Interface Device (HID) protocol.

9. A computer program product stored on a non-transitory computer-readable storage medium of a host device and comprising computer-readable instructions for execution by a processor of the host device, the instructions when executed by the processor causing the host device to:
    establish a first connection between the host device and the peripheral device, the first connection allowing unidirectional transfer of data from the peripheral device to the host device;
    establish a second connection between the host device and the peripheral device, the second connection allowing bidirectional transfer of data between the peripheral device and the host device;
    receive data from the peripheral device over the first connection;
    send data to the peripheral device over the second connection; and
    receive over the first connection, a request to launch an enhanced application, the enhanced application configured to receive input data from the peripheral device and further configured to send output data to the peripheral device.

10. The computer program product of claim 9 further comprising instructions for responsive to receiving the request to launch the enhanced application, establishing the second connection between the host device and the peripheral device.

11. A computer program product stored on a non-transitory computer-readable storage medium of a host device and comprising computer-readable instructions for execution by a processor of the host device, the instructions when executed by the processor causing the host device to:
    establish a first connection between the host device and the peripheral device, the first connection allowing unidirectional transfer of data from the peripheral device to the host device;
    establish a second connection between the host device and the peripheral device, the second connection allowing bidirectional transfer of data between the peripheral device and the host device;
    receive data from the peripheral device over the first connection;
    send data to the peripheral device over the second connection; and send, to the peripheral device over the second connection, a command for causing the peripheral device to mute the first connection, the muting causing the peripheral device to stop sending data over the unidirectional connection.

12. A computer program product stored on a non-transitory computer-readable storage medium of a host device and comprising computer-readable instructions for execution by a processor of the host device, the instructions when executed by the processor causing the host device to:

establish a first connection between the host device and the peripheral device, the first connection allowing unidirectional transfer of data from the peripheral device to the host device;

establish a second connection between the host device and the peripheral device, the second connection allowing bidirectional transfer of data between the peripheral device and the host device;

receive data from the peripheral device over the first connection;

send data to the peripheral device over the second connection; and receive, over the second connection, a request to launch a standard application, the standard application configured to receive input data from the peripheral device.

13. The computer program product of claim 12 further comprising instructions for responsive to receiving the request to launch the standard application, sending, to the peripheral device over the second connection, a command for causing the peripheral device to unmute the first connection.

* * * * *